UNITED STATES PATENT OFFICE.

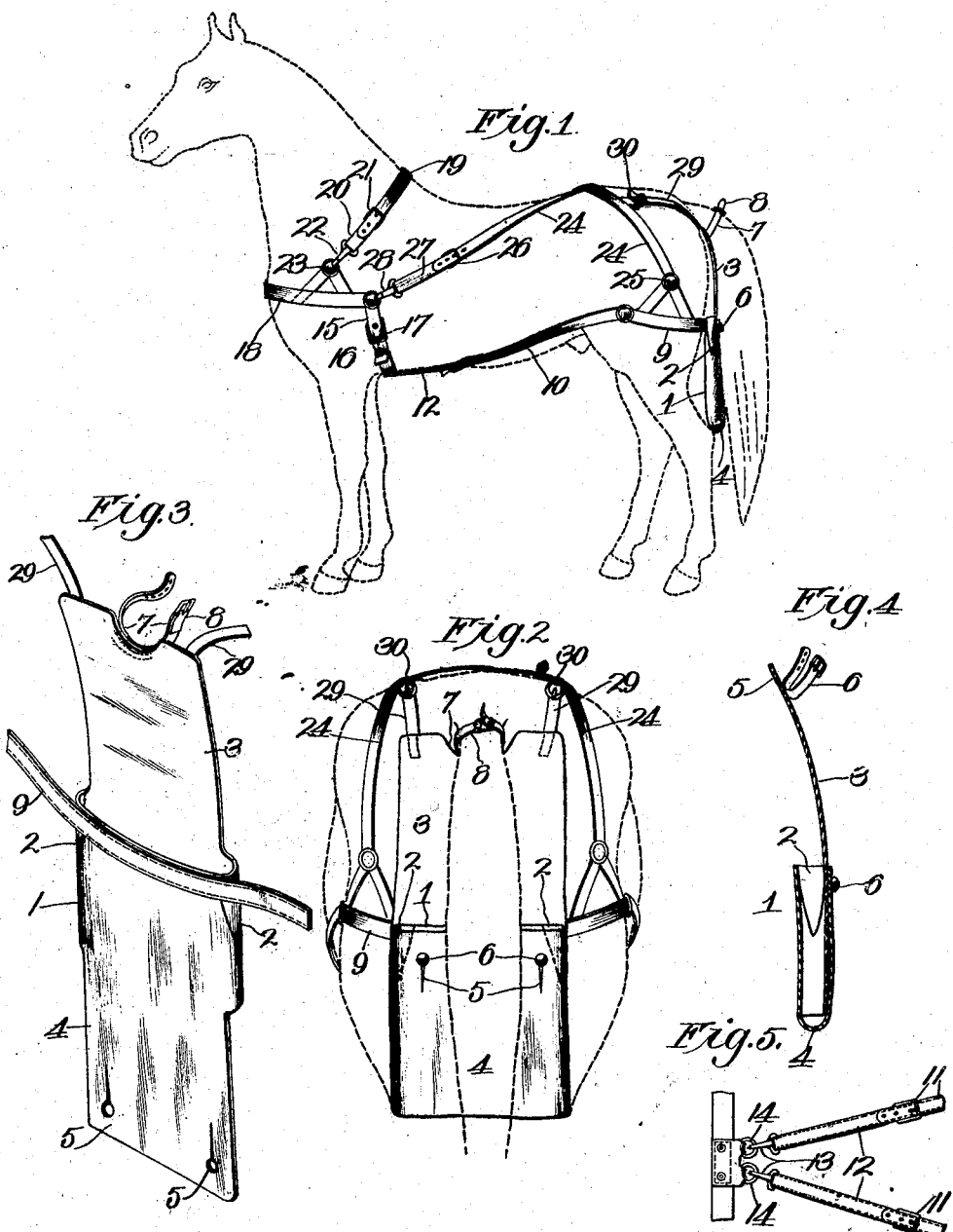

WILLIAM A. ROBERTS, OF KANSAS CITY, MISSOURI.

MANURE-POUCH.

No. 900,783.　　　Specification of Letters Patent.　　　Patented Oct. 13, 1908.

Application filed December 18, 1907. Serial No. 407,084.

To all whom it may concern:

Be it known that I, WILLIAM A. ROBERTS, a citizen of the United States, residing at Kansas City, in the county of Jackson and State of Missouri, have invented certain new and useful Improvements in Manure-Pouches, of which the following is a specification.

This invention relates to manure pouches and my object is to produce a device of this character for use upon a horse or other draft animal, while stabled, for the purpose of catching the manure and preventing it from soiling the straw or other bedding of the stall.

A further object is to produce a device of this character from which the manure can be easily and quickly discharged into a suitable receptacle if desired without necessitating the removal of the pouch.

A still further object is to produce means for securing the pouch so reliably in position that the animal may lie down and arise in the stall without causing the pouch to shift to an inoperative position.

A still further object is to produce means for securing the pouch in position which are adjustable to accommodate animals of varying proportions and which can be easily and quickly secured on or removed from an animal.

To these ends the invention consists in certain novel and peculiar features of construction and organization as hereinafter described and claimed; and in order that it may be fully understood reference is to be had to the accompanying drawing, in which—

Figure 1, is a side view of a horse equipped with a pouch and harness for holding the same in place, embodying my invention. Fig. 2, is a rear view of a portion of a horse equipped with the improvement. Fig. 3, is a detail perspective view of the pouch when open. Fig. 4, is a vertical section of the pouch when closed. Fig. 5, is a plan view of a portion of the harness.

In the said drawings a piece of canvas or equivalent material is formed into a flattened tube 1, provided with gores 2 at its upper end for the purpose of giving fullness to such end so that it shall open readily. Projecting upward from the rear side of the tube is an extension 3 and depending from the opposite side of the tube is a substantially similar extension 4 provided by preference with buttonholes 5 near its free end, extension 4 being adapted to fold up under the tube to form a bottom therefor as shown in Fig. 4, most clearly, and be lapped against the outer or rear side of the tube, the buttonholes 5 being adapted to engage the buttons 6, secured to said rear side to secure the extension 4 in place. The extension 3 is preferably formed with a central recess 7 in its upper end so as to fit snugly under the tail of the horse and secured to said extension is a buckle-equipped strap 8, to be passed around the horse's tail as indicated in Figs. 1 and 2, so that when the horse elevates his tail it will move extension 3 rearwardly and thus withdraw said extension out of the path of the falling manure, and also distend the mouth or upper end of the tube so that said manure shall fall into the latter.

To secure the tube reliably in place a harness is provided the same being constructed as follows;—9 indicates a breech strap arranged on the horse in the usual manner and secured to the upper end of the inner side of the tube as shown clearly in Fig. 3. 10 are straps connected to or they may form extensions of the breech strap and said straps or extensions 10 pass forwardly and inwardly under the horse and are buckled at 11, to short straps 12, secured by snap hooks 13 or equivalent devices to rings 14, or their equivalents attached as shown in Fig. 5 or in any other suitable manner, to a belly band, it being understood that the straps or extensions 10 and straps 12 are connected together by buckles 11 or their equivalents for adjustment purposes that is to accommodate horses of different sizes. The belly band preferably consists of a pair of straps 15 and 16 buckled together at 17 or otherwise fastened together for adjustment purposes, and said belly band at its opposite ends is connected to the rear ends of the breast strap 18, attached to a shoulder strap consisting of portions 19 and 20 buckled together at 21 for adjustment purposes, the said shoulder strap being preferably connected at its ends by snaps 22, only one appearing, to rings 23 attached to the breast strap, though it is obvious that only one snap 22 and ring 23 is needed. 24 are straps which cross each other on the back of the horse and are connected at their rear ends at 25 or otherwise to the breech strap. At their front ends, they are, for adjustment purposes, buckled at 26 to short straps 27 connected by snap hooks 28 to the rear ends of the breast strap and opposite ends of the belly band, it being obvious in this connection that only one short strap 27 and snap hook 28 is needed. 29 are short straps secured to the upper corners of extensions 3 and from said extensions they extend upwardly and forwardly and are buckled as at 30 to straps 24. With this harness the draft animal can lie down and arise without injury to or displacement of the pouch and it will be noticed that by disconnecting the straps of the belly band and the snap hooks 22 and 28 at one side only if they are employed at both sides, and by unbuckling strap 7, the harness and pouch can be instantly removed. It can also be replaced very quickly.

To remove the manure that accumulates in the pouch, the hostler places a box or any other suitable receptacle below the pouch and unfastens the flap or extension 4. As this is accomplished the weight of the manure in the pouch causes said unfastened flap to swing down and at the same time deflect the manure into the box or receptacle, it being obvious that when said flap is opened it forms practically a continuation of the front side of the tube and hence will prevent the contents of the latter from falling forwardly between the horse's legs.

From the above description it will be apparent that I have produced a manure pouch possessing the features of advantage enumerated as desirable and I wish it to be understood that I reserve the right to make all changes which properly fall within the spirit and scope of the appended claims.

Having thus described the invention what I claim as new and desire to secure by Letters-Patent, is:—

1. A manure pouch, comprising a tube having an extension at one side adapted to be folded under and form a bottom for the tube and be fastened to its opposite side, and an extension projecting upward from said opposite side of the tube.

2. A manure pouch, comprising a tube having an extension at one side adapted to be folded under and form a bottom for the tube and be fastened to its opposite side, and an extension projecting upward from said opposite side of the tube, and provided at its upper end with means for attaching it to the tail of a draft animal.

3. A flattened tube, having gores in its upper end and provided with an extension depending from its front side, adapted to be folded up and around the lower end of the tube, means for fastening the free end of said extension to the tube when thus folded, an extension projecting upward from the rear side of the tube and provided with a recess in its upper end, and a strap attached to said extension contiguous to the recess.

4. The combination with a suitable harness fitted upon a horse and provided with a pair of buckles 30 and a breech strap below said buckles, of a manure pouch comprising a tube fitted under the tail of the horse with its front side attached at its upper end to said breech strap and having its rear side provided with an upwardly projecting extension and having straps to engage said buckles and a strap adapted to be fastened around the tail of the horse, an extension projecting from the lower end of the front side of the tube and adapted to be folded back under the latter and up against its rear side, and means to detachably fasten said last-named extension to said back wall.

In testimony whereof I affix my signature, in the presence of two witnesses.

WILLIAM A. ROBERTS.

Witnesses:
H. C. RODGERS,
G. Y. THORPE.